United States Patent [19]

Cameron, Sr.

[11] Patent Number: 4,693,421
[45] Date of Patent: Sep. 15, 1987

[54] APPARATUS FOR CONDUCTING HOT GASES FROM AN EXHAUST PIPE

[76] Inventor: Allan Cameron, Sr., 4602 Morris Avenue, Terrace, British Columbia, Canada, V8G 2H1

[21] Appl. No.: 851,349

[22] Filed: Apr. 14, 1986

[30] Foreign Application Priority Data

Apr. 15, 1985 [CA] Canada .................................. 479107

[51] Int. Cl.⁴ ........................ B05B 1/24; B05B 15/06; B05B 15/08; F16L 25/00
[52] U.S. Cl. .................................. 239/129; 239/283; 239/588; 239/592; 285/177
[58] Field of Search ............... 239/129, 282, 283, 588, 239/592; 285/7, 8, 177

[56] References Cited

U.S. PATENT DOCUMENTS

| | | | |
|---|---|---|---|
| 1,327,428 | 1/1920 | Gregory | 239/588 X |
| 2,361,981 | 11/1944 | Tirrell | 239/129 X |
| 2,568,039 | 9/1951 | Torell | 239/588 X |
| 3,228,613 | 1/1966 | Goldstein | 239/588 X |
| 3,288,497 | 11/1966 | Nydam | 285/177 X |
| 4,383,692 | 5/1983 | Proctor | 285/177 X |
| 4,404,705 | 9/1983 | Thoma | 239/129 X |

*Primary Examiner*—Andres Kashnikow
*Assistant Examiner*—Patrick N. Burkhart
*Attorney, Agent, or Firm*—Carver & Co.

[57] ABSTRACT

An apparatus for conducting hot gases from an exhaust pipe has an elongated, flexible conduit with an inlet end and an outlet end. An inlet fitting on the inlet end of the conduit is shaped to tightly engage the exhaust pipe. An outlet fitting on the outlet end of the conduit is shaped to direct the hot gases to an object to be heated. The conduit may have a portion comprising a flexible, spirally wound conduit which is flexible when twisted in one direction and locks in a desired position when twisted in a direction opposite the one direction. The inlet fitting may have a seal for fitting exhaust pipes of different sizes. The seal comprises a resilient annular member having a central aperture for receiving the exhaust pipe.

3 Claims, 10 Drawing Figures

APPARATUS FOR CONDUCTING HOT GASES FROM AN EXHAUST PIPE

FIELD OF THE INVENTION

This invention relates to an elongated conduit for conducting exhaust gases from an exhaust pipe to an object to be heated.

BACKGROUND OF THE INVENTION

During winter in colder climates many mechanical components become frozen during periods of extreme cold. Such components may be associated with the automobile, such as transmissions, brakes, door locks and carburettors. It is also desirable in many cases to pre-warm small internal combustion engines such as those employed on chain saws. Other such heating operations, for example the thawing of water faucets, should be done by relatively safe means not employing a flame.

Exhaust gases from automobiles and other internal combustion engine devices have been employed in the past for various heating operations. For example, permanent installations on automobiles have been used to heat carburettors or the interior of the automobile by means of a heat exchanger. One such device is disclosed, for example, in Canadian Patent No. 144,864 to Matthews. Canadian Patent No. 285,104 to Huntley discloses a heater employing exhaust gases to heat the differential housing of an automobile. Canadian Patent No. 337,940 to Miller discloses another device using exhaust gases to heat a transmission and differential housing. Canadian Patent No. 1,099,680 to Prucyk discloses a device employing exhaust gases to heat paint for a pavement striper.

The devices discussed above do not offer a portable apparatus suitable for temporary connection to various exhaust pipes and which can be easily manoeuvred and positioned to heat components of an automobile or exterior objects requiring heating.

SUMMARY OF THE INVENTION

The invention provides an apparatus for conducting hot gases from an exhaust pipe. The apparatus has an elongated, flexible conduit with an inlet end and an outlet end. There is an inlet fitting on the inlet end of the conduit shaped to tightly engage the exhaust pipe. An outlet fitting on the outlet end of the conduit is shaped to direct the hot gases to an object to be heated.

Preferably the conduit has a portion comprising a spirally wound conduit which is flexible when twisted in one direction and locks in a desired position when twisted in a direction opposite the one direction.

The inlet fitting may have a seal for fitting exhaust pipes of different sizes. The seal comprises a resilient annular member having a central aperture for receiving the exhaust pipe.

DESCRIPTION OF THE PREFERRED EMBODIMENTS

Figure 1:
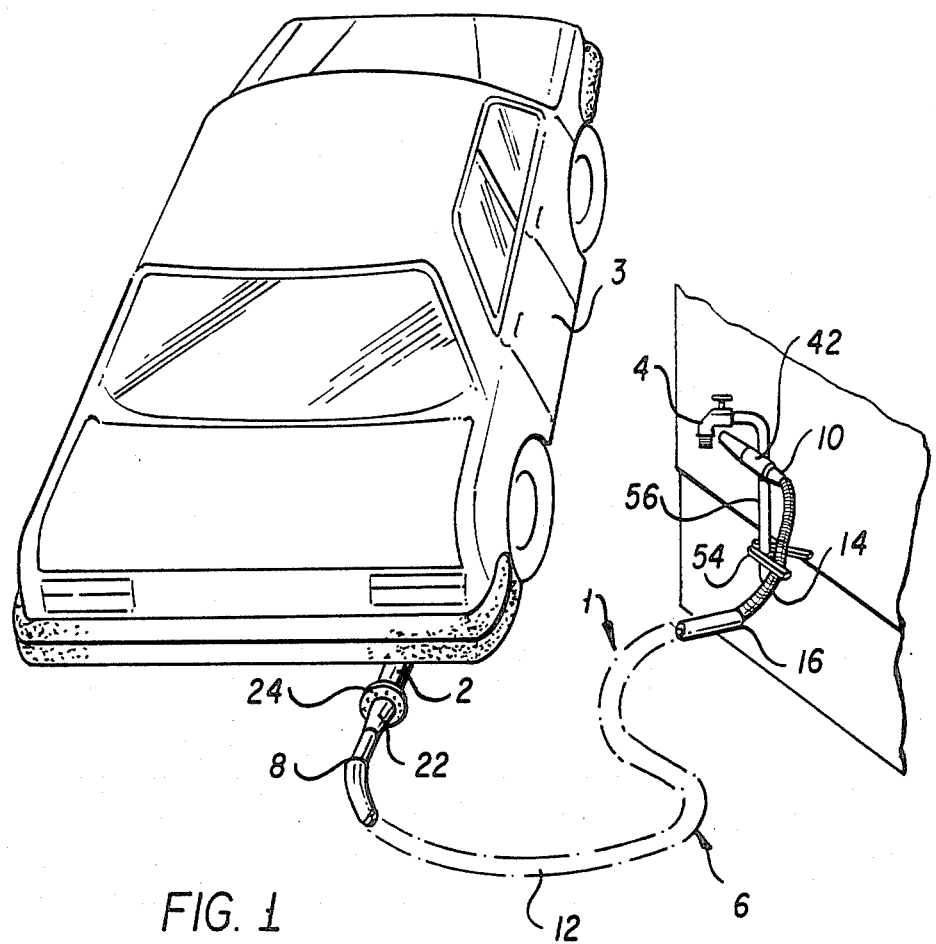
FIG. 1 is a perspective view of an apparatus for conducting hot exhaust gases from an exhaust pipe, shown connected to the exhaust pipe of an automobile and positioned so as to direct the hot gases on an outdoor water faucet.
Figure 10:
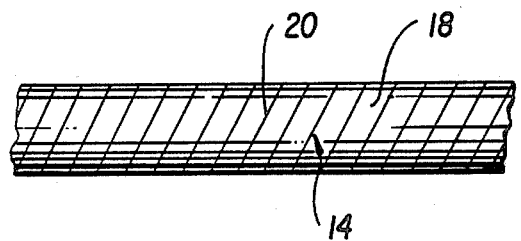
FIG. 10 is a fragmentary view of the spirally wound portion of the conduit shown in FIG. 1.

Referring firstly to FIG. 1, this shows an apparatus 1 for conducting hot gases from an exhaust pipe 2 to an object to be heated, in this case an outdoow water faucet 4. Although shown connected to the exhaust pipe of an automobile, the apparatus may be connected to the exhaust pipe of other equipment employing an internal combustion engine. The apparatus has three major components. The first is an elongated, flexible conduit 6 which has an inlet end 8 and an outlet end 10. The conduit has two portions. The first portion 12 is, in this preferred embodiment, a flexible cotton hose, similar to those used for fire hoses. Of course other flexible conduits capable of carrying hot exhaust gases could be substituted. The conduit 6 has a second portion portion 14 connected to first portion 12 at a point 16. The second portion 14 is made of a spirally wound conduit. This is shown in more detail in FIG. 10. Such conduits are commercially available and are typically used as electrical conduits. A large diameter such conduit is required for this apparatus. Such conduits are made of a single length of sheet metal 18 which is shaped and interlocked in manufacture to form a spiral, flexible joint 20 extending along the length of the conduit. Because of the spiral winding, the conduit can be tightened by twisting it in one direction, for example clockwise, according to the direction of the spiral. By "untwisting" the conduit in the opposite direction, for example counterclockwise, the conduit is loosened and becomes more flexible.

Figure 6:
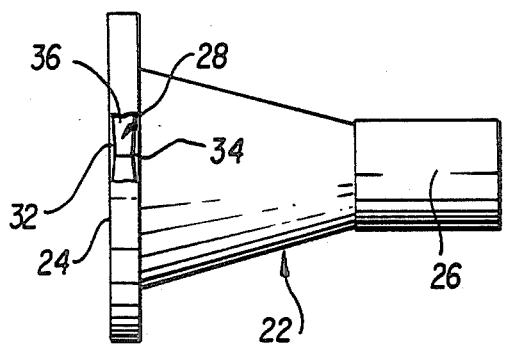
FIG. 6 is a side elevation of the inlet fitting used on the apparatus of FIG. 1.
Figure 7:
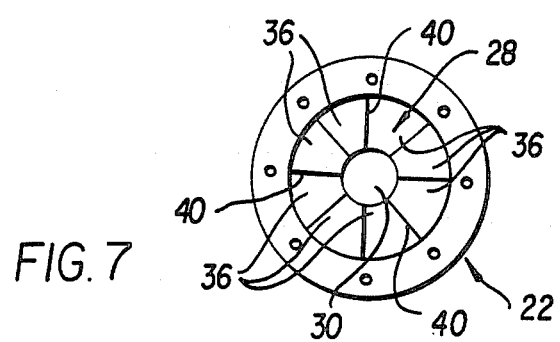
FIG. 7 is an end view of the fitting of FIG. 6.

The apparatus also includes an inlet fitting 22 which is shown in better detail in FIG. 6 and 7. As may be seen in the elevational view of FIG. 6, the inlet fitting is in the shape of a truncated cone with a larger end 24 which is the open end directed towards the exhaust pipe 2 as shown in FIG. 1. The opposite end 26 is connected to portion 12 of the conduit 6. The inlet fitting has a seal which comprises a resilient annular member 28, shown best in FIG. 7, which extends outwardly from a central aperture 30 and is held between a pair of outer, rigid rings 32 and 34. This is shown best in the breakaway in FIG. 6. The member is made of heat resistant rubber in the preferred embodiment, although alternative materials could be substituted. The annular member 28 has a plurality of sections 36 which are each separated by a radially extending slit 40, each of which extends from aperture 30 to rings 32 and 34. The aperture 30 is slightly smaller than any exhaust pipe the apparatus is adapted to fit. The slits and the resilient material of member 28 allow inlet fitting 22 to be forced over exhaust pipes somewhat larger than aperture 30. Thus the inlet fitting is designed to fit a wide range of exhaust pipe sizes.

Figure 2:
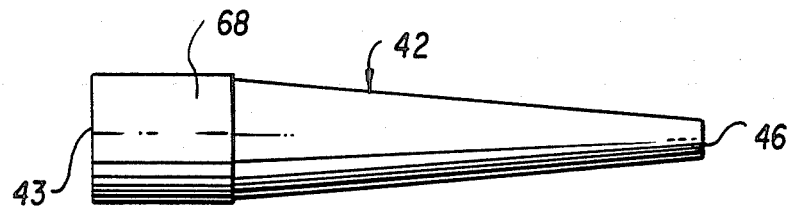
FIG. 2 is a side elevation of the outlet fitting of the embodiment shown in FIG. 1 which is shaped to concentrate exhaust gases.
Figure 3:
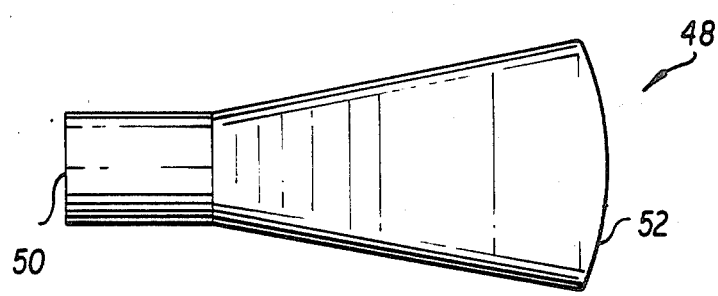
FIG. 3 is a side elevation of an alternative outlet fitting shaped to diffuse the exhaust gases.
Figure 4:
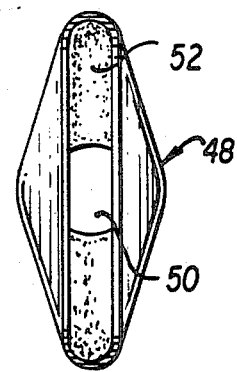
FIG. 4 is an end view of the fitting of FIG. 3.

The apparatus 1 is fitted with an outlet fitting 42 shown in FIG. 1 and in better detail in FIG. 2. This outlet fitting may be seen to be in the shape of a truncated cone which tapers outwardly from end 43 which is connected to portion 14 of conduit 6 towards open end 46 where exhaust gases are discharged. Since end 46 has a diameter smaller than end 43 this fitting acts as a nozzle to concentrate the exhaust gases at a higher velocity on a limited area. This increases the heating effect for a relatively small area. p An alternative outlet fitting 48 is shown in FIGS. 3 and 4. This fitting has an end 50 which is connected to portion 14 of conduit 6 and an open end 52 which is an elongated slot as best shown in FIG. 4. It may be seen that the fitting is flattened and fan-shaped to diffuse the exhaust gases over a relatively wide area. Thus this outlet fitting is used when the heating effect is desired over a more general area.

Figure 5:
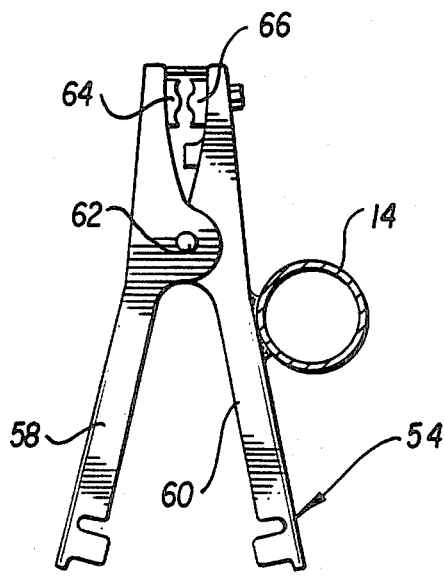
FIG. 5 is an elevation of the clamp used on the apparatus of FIG. 1.

A clamp 54, shown in detail in FIG. 5, may be used to secure the outlet end of the apparatus in position so the exhaust gases are directed onto the object requiring heating. For example, in FIG. 1 clamp 54 is used to secure portion 14 of conduit 6 to a vertical section of pipe 56 leading to faucet 4. The exhaust gases can be manually directed by the user holding outlet fitting 42 and directing the gases to the required spot. However, clamp 54 allows the apparatus to be clamped to some suitable point so the user can go about other activities. When the aparatus is used for thawing a carburettor, for example, clamp 54 can be secured to some convenient part under the hood of the car, such as the radiator. The clamp is connected to portion 14 of conduit 6 near the end opposite fitting 42. As shown in FIG. 5 clamp 54 is very similar to the type of clamp used on jumper cables for clamping to battery posts. It consists of a pair of members 58 and 60 which are pivotally connected by a pin 62. The members are resilient biased in the conventional manner so that jaws 64 and 66 are urged towards each other. The portion 14 of conduit 6 is twisted to lock portion 14 in position, as shown by way of example in FIG. 1, and thus keep the exhaust gases trained on the object being heated with the aid of clamp 54.

Figure 8:
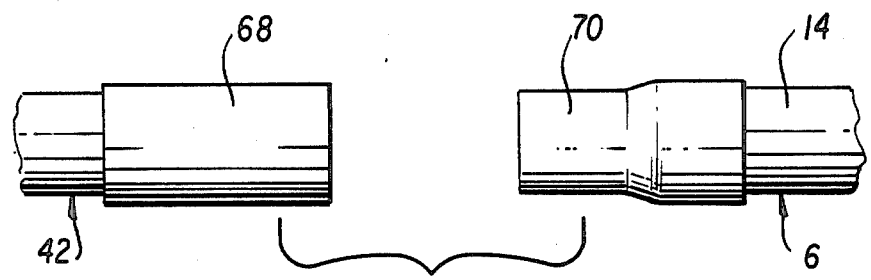
FIG. 8 is a side elevation of a typical connection used on the apparatus, shown disconnected.
Figure 9:
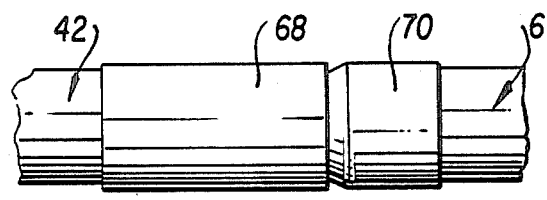
FIG. 9 is a side elevation of a typical connection showing the portions of the conduit connected.

FIGS. 8 and 9 illustrate the type of connection used throughout. One of the members 68 which may be, for example, part of outlet fitting 42, is a straight section of pipe. The other member 70 is tapered and connected, for example, to portion 14 of conduit 6. The members are connected by holding member 68 firmly in one hand and inserting member 70 into member 68 with the other hand and then firmly pushing member 68 onto member 70 and turning them. This achieves the connection shown in FIG. 9. The members are released by holding member 68 with one hand and with the other hand rocking member 70 back and forth once each way while pulling the members apart. Thus the members are disconnected as shown in FIG. 8. As may be seen, the apparatus is a compact unit for easy storage.

What is claimed is:

1. An apparatus for conducting hot gases from an exhaust pipe, the apparatus comprising:
   (a) an elongated, flexible conduit with an inlet end and an outlet end, the conduit having a portion comprising a spirally wound conduit which is flexible when twisted in one direction and locks in a desired position when twisted in a direction opposite the one direction, the portion being adjacent the outlet end;
   (b) an outlet fitting on the outlet end of the conduit, shaped to direct the hot gases to an object to be heated;
   (c) an inlet fitting on the inlet end of the conduit having a flexible seal for frictionally engaging exhaust pipes of different sizes, the seal comprising a resilient annular member having a central aperture therein for receiving the exhaust pipe, the inlet fitting having a truncated conical shape which has a larger end for facing towards the exhaust pipe, the member being adjacent the larger end and having radial slits extending outwardly from the central aperture whereby the gases can escape between the slits if the conduit or the outlet fitting is blocked; and
   (d) clamp means on the conduit for holding the outlet fitting in position, the clamp means being near an end of the portion of the conduit opposite the outlet fitting, the clamp means including a pair of pivotally connected members which are resiliently biased towards each other.

2. An apparatus as claimed in claim 1, wherein the outlet fitting is in the shape of an outwardly tapering truncated cone to concentrate the exhaust gases on the object.

3. An apparatus as claimed in claim 1, wherein the outlet fitting is flattened and fan-shaped to diffuse the exhaust gases onto the object.

* * * * *